United States Patent
Metz

(10) Patent No.: US 7,322,391 B2
(45) Date of Patent: Jan. 29, 2008

(54) VEHICLE PNEUMATIC TIRE HAVING TRUNCATED GROOVE

(75) Inventor: Markus Metz, Neustadt (DE)

(73) Assignee: Continental Aktiengesellschaft, Hannover (DE)

( * ) Notice: Subject to any disclaimer, the term of this patent is extended or adjusted under 35 U.S.C. 154(b) by 193 days.

(21) Appl. No.: 11/088,760

(22) Filed: Mar. 25, 2005

(65) Prior Publication Data

US 2005/0211355 A1 Sep. 29, 2005

(30) Foreign Application Priority Data

Mar. 26, 2004 (EP) ................................. 04007319

(51) Int. Cl.
*B60C 11/12* (2006.01)
*B60C 11/13* (2006.01)

(52) U.S. Cl. ................... 152/209.18; 152/209.21; 152/209.24; 152/901; 152/902; 152/DIG. 3

(58) Field of Classification Search ........... 152/209.15, 152/209.18, 209.21, 209.24, 901, 902, DIG. 3
See application file for complete search history.

(56) References Cited

U.S. PATENT DOCUMENTS

| | | | | |
|---|---|---|---|---|
| 3,998,256 | A | * | 12/1976 | Verdier .................. 152/902 |
| 5,031,680 | A | * | 7/1991 | Kajikawa et al. .......... 152/902 |
| 5,088,536 | A | * | 2/1992 | Graas et al. .................. 152/902 |
| 5,343,914 | A | * | 9/1994 | Wako ......................... 152/902 |
| 5,833,781 | A | * | 11/1998 | Fukumoto et al. ...... 152/DIG. 3 |
| 5,960,845 | A | | 10/1999 | Wada |
| 6,343,636 | B1 | | 2/2002 | Hanya et al. |
| 2004/0256040 | A1 | * | 12/2004 | Ratliff, Jr. .............. 152/209.24 |

FOREIGN PATENT DOCUMENTS

| | | | |
|---|---|---|---|
| EP | 0816130 | | 1/1998 |
| EP | 989000 | * | 3/2000 |
| JP | 2002-240513 | * | 8/2002 |
| JP | 2003-011619 | * | 1/2003 |

* cited by examiner

*Primary Examiner*—Steven D. Maki
(74) *Attorney, Agent, or Firm*—Greenblum & Bernstein, P.L.C.

(57) ABSTRACT

A tire including a tread rubber having at least one positive profile. Wherein the positive profile is formed by at least one circumferential groove. Further, the tire includes at least one truncated groove extending into the positive profile from the circumferential groove, such that the truncated groove includes at least one flank surface. Further still, the tire includes the truncated groove being inclined at an acute angle to a direction of rotation of the tire. The tire includes a pitch of the flank surface that continuously changes with respect to the radial direction over a length of the truncated groove. The tire being a vehicle pneumatic tire. The instant abstract is neither intended to define the invention disclosed in this specification nor intended to limit the scope of the invention in any way.

12 Claims, 3 Drawing Sheets

VEHICLE PNEUMATIC TIRE HAVING TRUNCATED GROOVE

CROSS-REFERENCE TO RELATED APPLICATIONS

The present application claims priority under 35 U.S.C. §119 of European Patent Application No. 04 007 319.9, filed on Mar. 26, 2004, the disclosure of which is expressly incorporated by reference herein in its entirety.

BACKGROUND OF THE INVENTION

1. Field of the Invention

The invention relates to a vehicle pneumatic tire with a tread rubber which has positive profiles, e.g., tread rubber strips or blocks in block rows, formed by circumferential grooves and the like. The positive profiles are provided with truncated grooves which starting from a circumferential groove extend into the tread rubber strip or a block and run inclined at an acute angle to the direction of rotation of the fitted tire.

2. Discussion of Background Information

Vehicle pneumatic tires with tread rubber profiles thus embodied are known in different embodiment variants. Customary examples are tires with profiles that have tread rubber strips and block rows or exclusively tread rubber strips. Tread rubber strips with truncated grooves have the advantage of a high profile stiffness in the circumferential direction. However, their ability to ensure sufficient drainage of the tread rubber to prevent aquaplaning on a wet surface is usually in need of improvement.

SUMMARY OF THE INVENTION

The present invention improves a vehicle pneumatic tire with a tread rubber profile of the type mentioned at the outset with respect to its drainage capacity.

A vehicle pneumatic tire embodied according to the invention is characterized by truncated grooves, the groove flank of which is flowed against by water when the tire rolls on a wet surface, has a flank surface, the pitch of which with respect to the radial direction continuously changes over its extension so that the flank surface at the circumferential groove encloses its greatest angle with the radial direction.

Through this particularly formed flank surface, water flowing into the truncated groove can be drained off both to the side and over the circumferential grooves in the circumferential direction while largely avoiding turbulences.

In order to avoid as far as possible undesired turbulences of water flowing against it, the flank surface should run with changing pitch in the area of the circumferential groove at an angle of 45° to 80° to the radial direction. The greater this angle, the better the distribution of water flowing against it.

The flank surface with changing pitch opposite this flank surface can be embodied in the conventional manner, in particular at least run in the radial direction.

In order to keep the groove volume of transverse grooves limited by block flanks embodied according to the invention essentially within the range customary for transverse grooves, it is advantageous if the groove base area between the two flank surfaces is embodied in a special manner in that it has a width increasing continuously over its extension, starting with the circumferential groove. The width of the groove base area in the region of the circumferential groove can thereby be very small or zero.

The truncated grooves provided with flanks embodied according to the invention can further have a lower depth compared to the profile depth. This measure is advantageous for the circumferential stability of the positive profile.

It is particularly advantageous if positive profiles are provided in the tread rubber, which positive profiles have truncated grooves inclined in the one circumferential direction and others which have truncated grooves inclined in the other circumferential direction, whereby respectively the groove surface flowed against, depending on the direction of rotation of the tire, is that which has a flank surface with changing pitch. A tire embodied in this manner can be operated with equally good properties in both directions of rotation.

The invention provides a tire including a tread rubber having at least one positive profile. Wherein the positive profile is formed by at least one circumferential groove. Further, the tire includes at least one truncated groove extending into the positive profile from the circumferential groove, such that the truncated groove includes at least one flank surface. Further still, the tire includes the truncated groove being inclined at an acute angle to a direction of rotation of the tire. The tire includes a pitch of the flank surface that continuously changes with respect to the radial direction over a length of the truncated groove. The invention provides the tire being a vehicle pneumatic tire.

According to another feature of the invention the greatest angle of the pitch of the flank surface to the radial direction is approximate to the circumferential groove. Further, the pitch of the flank surface approximate the circumferential groove is an angle of 45° to 80° to the radial direction. Further still, the pitch of the flank surface approximate a distal end of the truncated groove opposite the circumferential groove is approximately in the radial direction. The tire includes a steep flank surface opposite the flank surface having a pitch approximate in the radial direction.

According to another feature of the invention the tire includes a base width of the truncated groove continuously increases over the length of the truncated groove. Further, the base width continuously increases from the circumferential groove over the length of the truncated groove. Further still, the base width at the circumferential groove is at its smallest width. The circumferential groove has a lower depth than the at least one truncated groove.

According to another feature of the invention the tire includes the circumferential groove defining two opposite positive profiles, wherein each positive profile includes at least one truncated groove extending from the circumferential groove. Further, the truncated grooves in the opposite profiles are arranged to be inclined in opposite directions.

According to another feature of the invention the tire includes a direction of tire rotation determining whether a flow is created through the truncated grooves of one of the two positive profile or through the truncated grooves of the other of the two positive profiles. Further, at least one positive profile comprises of tread rubber strips. Further still, at least one positive profile comprises blocks arranged in block rows.

According to another feature of the invention the tire includes the truncated groove being arranged, such that when rolling on a wet surface, water flows against the groove flank.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
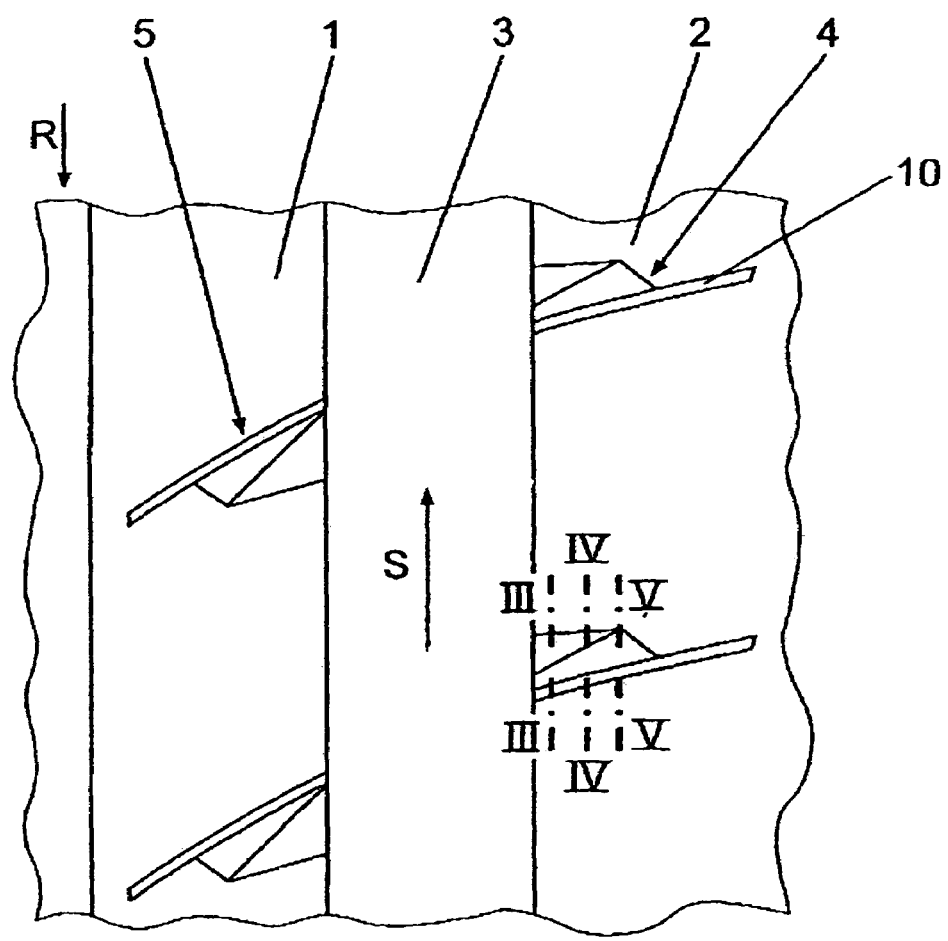
FIG. 1 A plan view of a partial development of a partial area of a tread rubber for a vehicle pneumatic tire, FIG. 2 A detail of a tread rubber embodied according to the invention in oblique view FIG. 3 through 5 Sections along lines III-III, IV-IV and V-V of FIG. 1.

FIG. 1 shows by way of example profile structures that can be embodied according to the invention. These profile structures include tread rubber strips 1, 2 running in the circumferential direction of the tread rubber. Strips 1, 2 are separated from one another by a wide circumferential groove 3. Other profile structures, such as tread rubber strips or block rows, can be connected laterally to these strips 1, 2, separated by further circumferential grooves. The tread rubber strips 1, 2 are provided with truncated grooves 4, 5 which extend into the two strips 1, 2 starting from the wide circumferential groove 3. The truncated grooves 4 arranged in the tread rubber strip 2 shown on the right in FIG. 1 are inclined at an acute angle with regard to the one circumferential direction, the truncated grooves 5 arranged in the other tread rubber strip 1 are inclined at an acute angle to the other circumferential direction.

Figure 2:
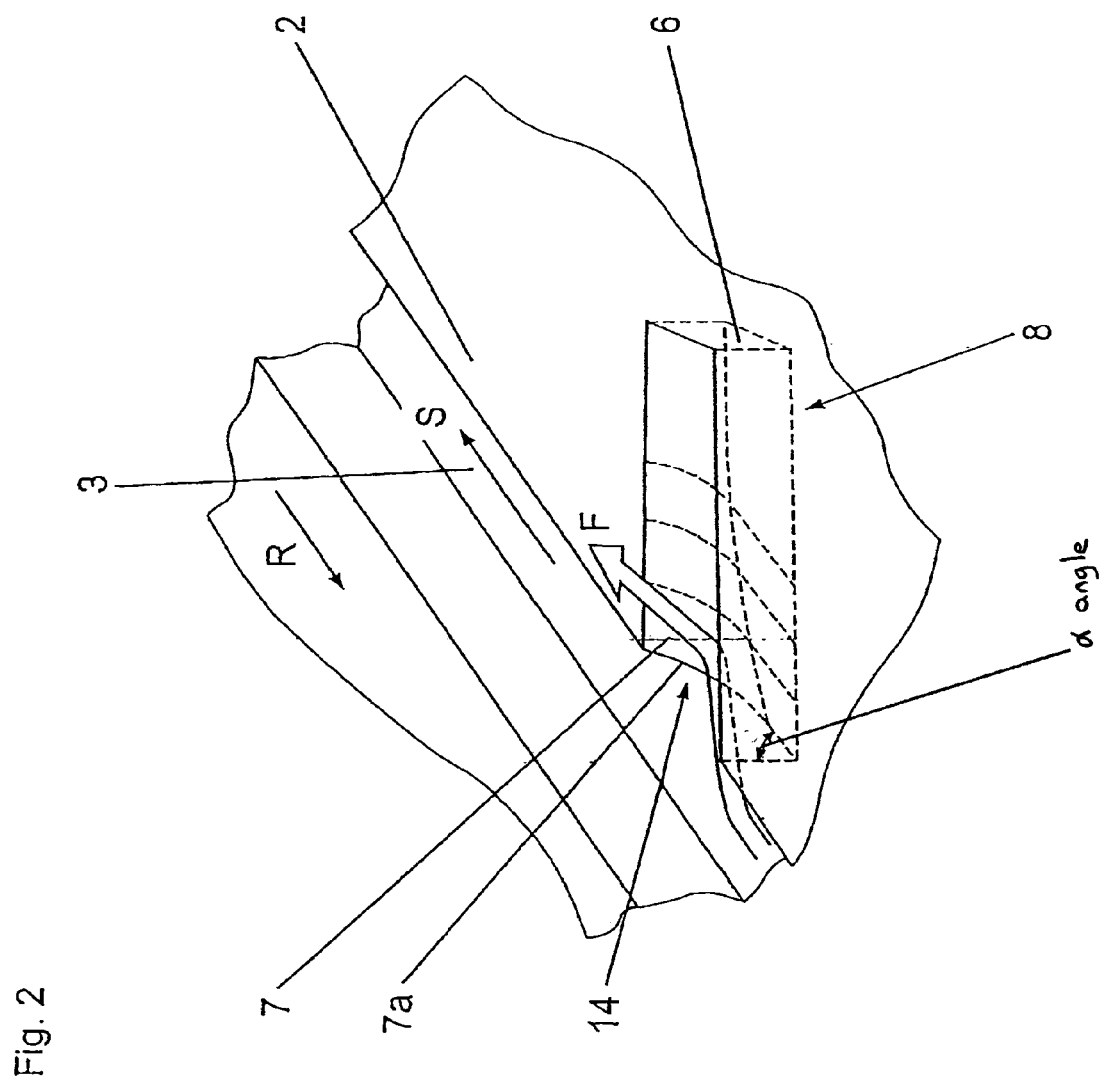
Figure 3:
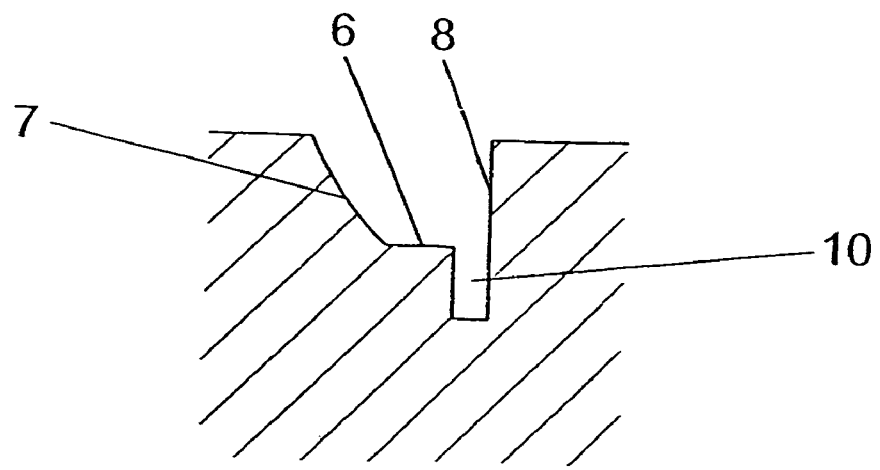
Figure 4:
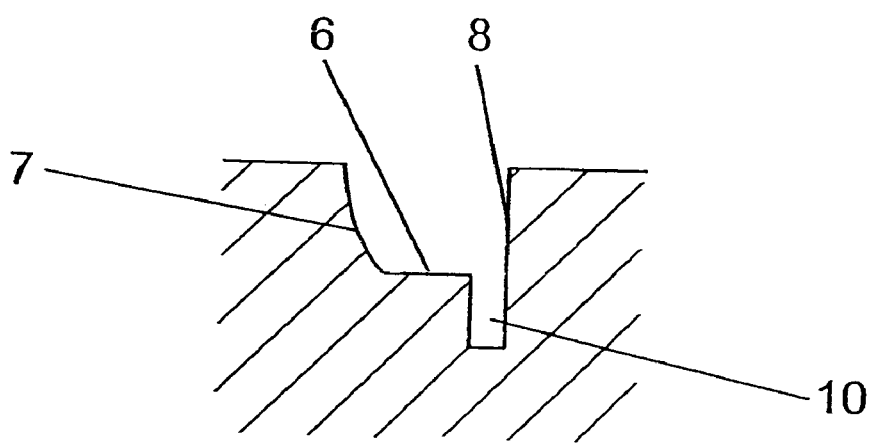
Figure 5:
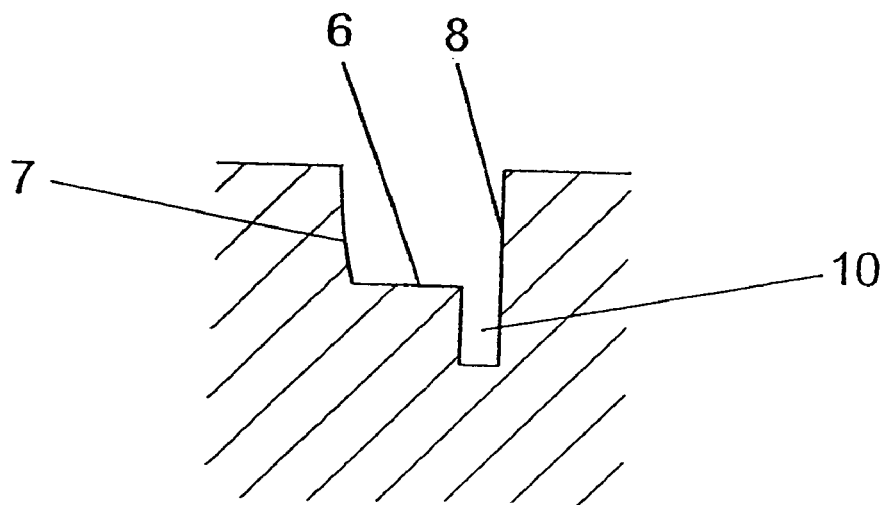

According to the invention the flank surfaces of the truncated grooves 4, 5 are embodied in a special manner. As the simplified embodiment in FIG. 2 shows, the illustrated truncated groove 14 is essentially limited by a groove base area 6, a flank surface 7 with a changing angle and a steep flank surface 8. The steep flank surface 8 runs over its length preferably at an at least essentially constant angle of 0 to approx. 5° to the radial direction. The flank surface 7 opposite the steep flank surface 8 runs on its edge 7a to the circumferential groove 2 at an angle α of 45° to 80° to the radial direction, whereby the angle α (see FIG. 2) in the direction of the closed end of the truncated grove 14 is reduced, so that the inside end of the flank surface 7 runs either in the radial direction or at an angle α that deviates only slightly, in particular up to 5°, from the radial direction. The groove base area 6 changes in width over its course such that it features its smallest width at the circumferential groove 3 and its greatest width at the end of the truncated groove 14. The groove base area 6 in the region of the circumferential groove 3 can thereby also have a zero width. Through this embodiment, with a truncated groove 14 embodied according to the invention, the two edges at the profile surface, as is usually the case with conventional truncated grooves, can reduce their mutual spacing in the direction towards the truncated groove end.

FIG. 2 also clarifies the operating method of truncated grooves embodied according to the invention. The arrow R shows the direction of rotation of the tire, the arrow S shows the flow direction of water penetrating into the circumferential groove 3 when the tire is driven on a wet surface. In the case of driving on a wet surface, depending on the driving speed, a water wedge is formed in front of the tire, the water of which is intended to be drained off through the circumferential grooves and the other grooves, e.g., the truncated grooves. The truncated groove 14 shown is inclined against the direction of rotation R and in the flow direction S. The flank surface 7 shown in FIG. 2 is therefore able to support transporting the water away from the truncated groove 14 closed in the flow direction. This is clarified by the arrow F in FIG. 2, which arrow shows the flow path of water flowing into the truncated groove 14 and clarifies that water flowing into the truncated groove 14 is guided into the wide circumferential groove 3.

The truncated grooves 4, 5 shown in FIG. 1 and FIGS. 3 through 5 do not extend to the profile depth of the circumferential grooves 3, but to about 50% of the profile depth. Apart from respectively one narrow stripe 10 provided in addition in extension of the steep flank surface 8, which stripe extends almost to the profile depth and which extends over the end of the truncated grooves 5, 7, the truncated grooves 4, 5 are embodied according to the truncated groove 14 shown in FIG. 2.

The truncated grooves 4 provided in the tread rubber strip 2 in FIG. 1 are oriented according to FIG. 2. The truncated grooves 5 running in the tread rubber strip 1 are likewise embodied according to the invention but inclined in the other circumferential direction and the positions of the flank surfaces 7 and 8 are transposed with respect to those in the truncated grooves 4 so that if the tire rotates in the other circumferential direction, the truncated grooves 5 are the ones that drain off water according to the invention. The tire can thus be operated in both directions of rotation with the same effect.

The invention is not restricted to the embodiment shown. Thus, for example, with a tread rubber profile embodied in a directional manner, the orientation of all truncated grooves can correspondingly coincide with respect to the direction of rotation.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A tire comprising:
   a tread rubber having at least one positive profile, said positive profile formed by at least one circumferential groove; and
   at least one truncated groove extending into said positive profile from said circumferential groove, said truncated groove including at least one flank surface,
   wherein said truncated groove is inclined at an acute angle to a direction of rotation of the tire, and a pitch of said flank surface continuously changes with respect to the radial direction over a length of said truncated groove,
   wherein a width of the truncated groove at the tread surface is widest at the circumferential groove, and
   wherein a base width of said truncated groove continuously increases from said circumferential groove over the length of said truncated groove.

2. The tire in accordance with claim 1, wherein the tire is a vehicle pneumatic tire.

3. The tire in accordance with claim 1, wherein a greatest angle of the pitch of said flank surface to the radial direction is approximate said circumferential groove.

4. The tire in accordance with claim 1, wherein the pitch of said flank surface approximate said circumferential groove is an angle of 45° to 80° to the radial direction.

5. The tire in accordance with claim 1, wherein the pitch of said flank surface approximate a distal end of said truncated groove opposite said circumferential groove is approximately in the radial direction.

6. The tire in accordance with claim 1, a steep flank surface opposite said flank surface has a pitch approximate in the radial direction.

7. The tire in accordance with claim 1, wherein said base width at said circumferential groove is a smallest width.

8. The tire in accordance with claim 1, wherein said circumferential groove has a deeper depth than said at least one truncated groove.

9. The tire in accordance with claim 1, wherein said circumferential groove defines two opposite positive profiles, and each positive profile includes at least one truncated groove extending from said circumferential groove.

10. The tire in accordance with claim 9, wherein said truncated grooves in said opposite profiles are arranged to be inclined in opposite directions.

11. The tire in accordance with claim 1, wherein said at least one positive profile comprises tread rubber strips.

12. The tire in accordance with claim 1, wherein said at least one positive profile comprises blocks arranged in block rows.

* * * * *